Aug. 1, 1933.  W. L. LENTZ ET AL  1,920,754
LOCOMOTIVE TENDER CONSTRUCTION
Filed Dec. 14, 1929  5 Sheets-Sheet 1
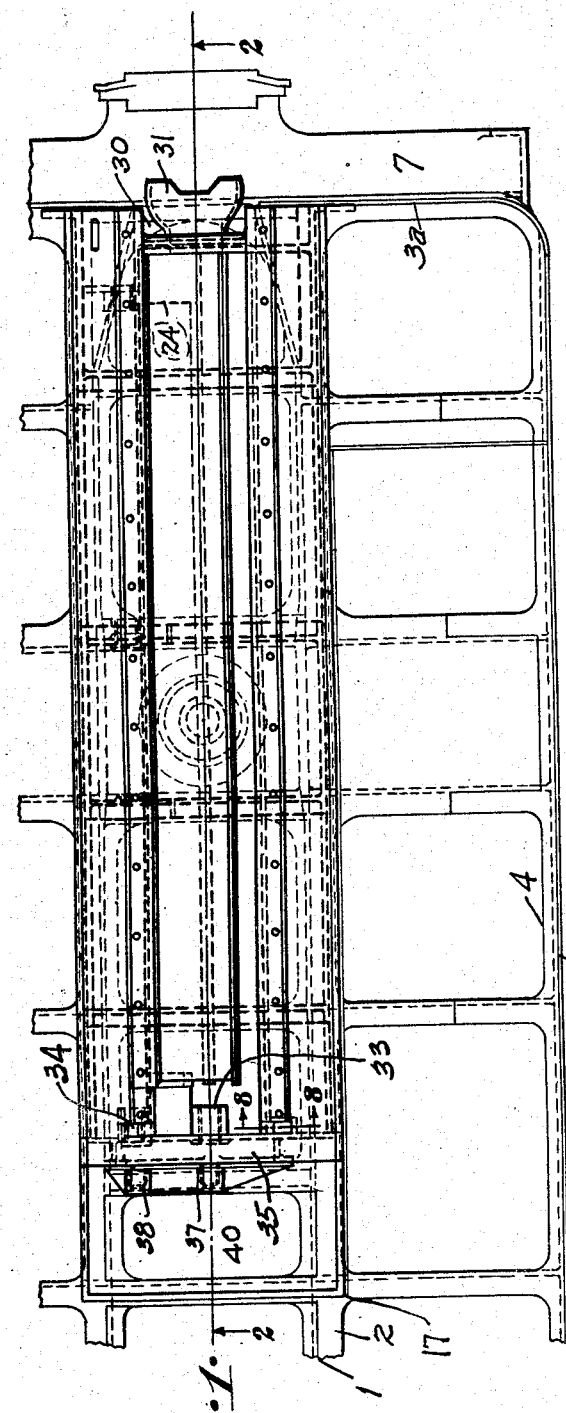
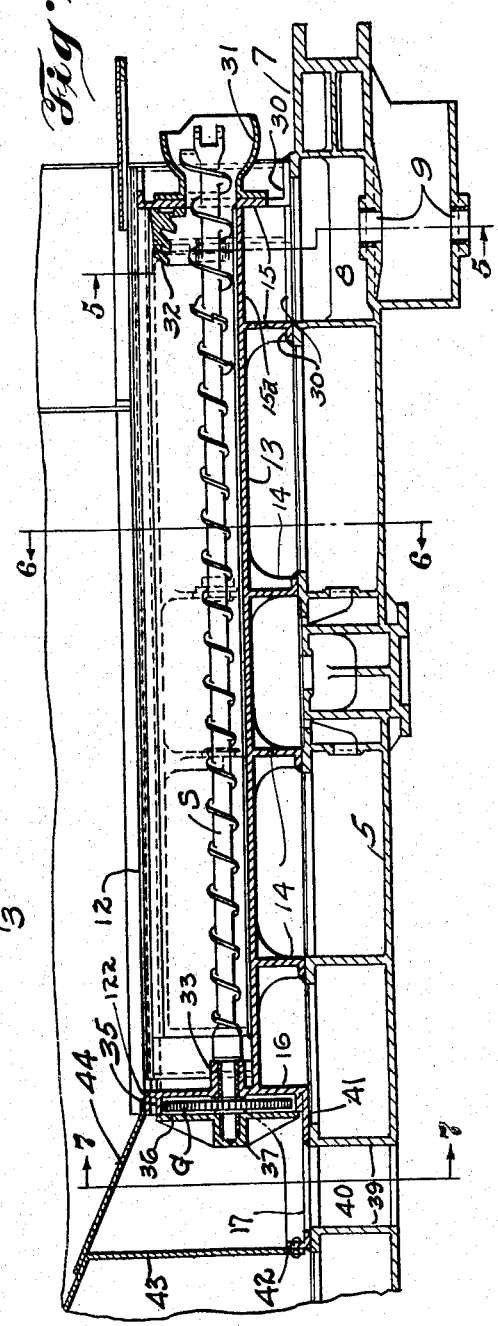
Inventors
William L. Lentz
William M. Sheehan
By Rodney Bedell
Attorney

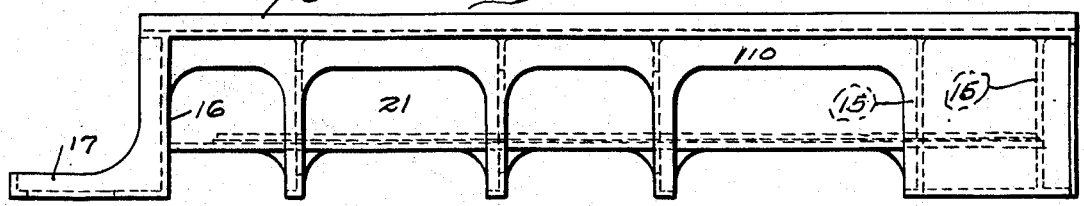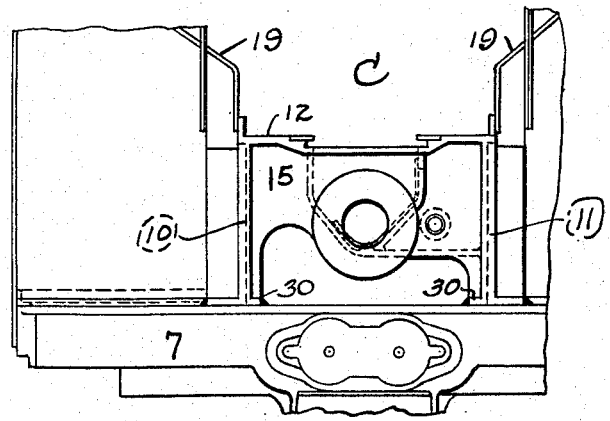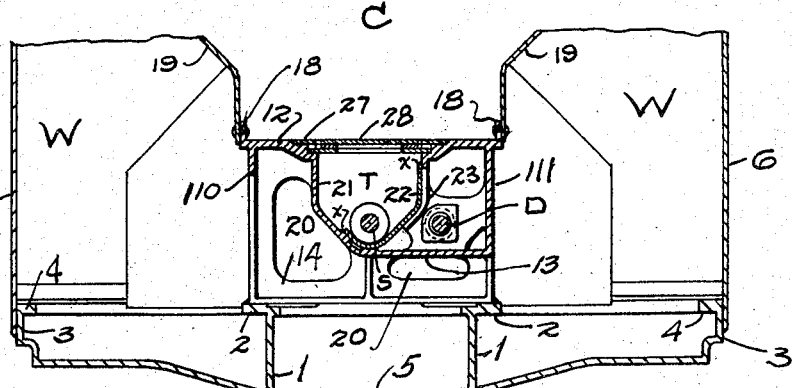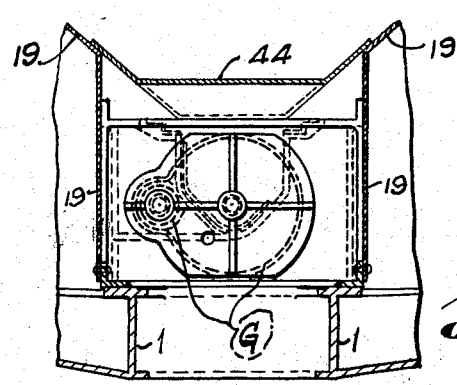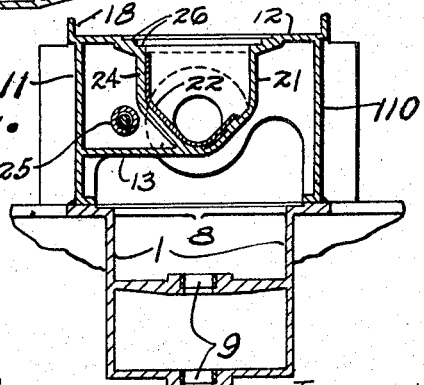

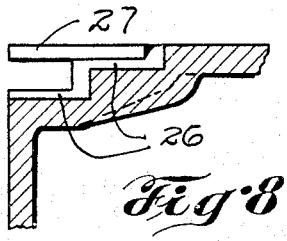
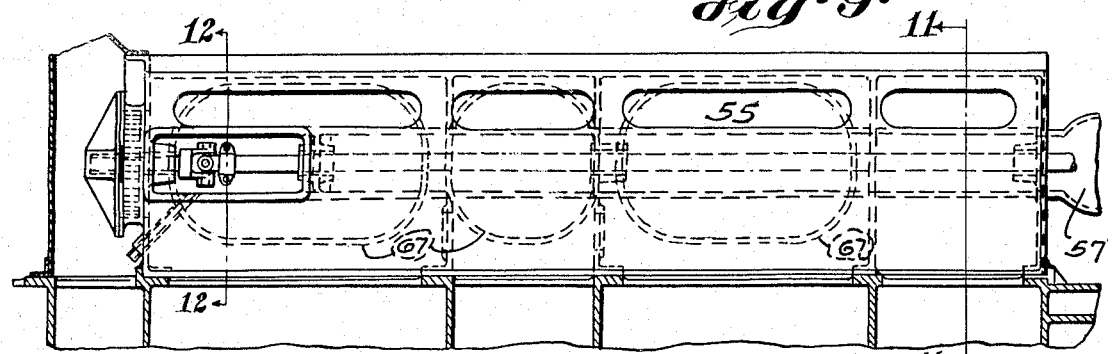
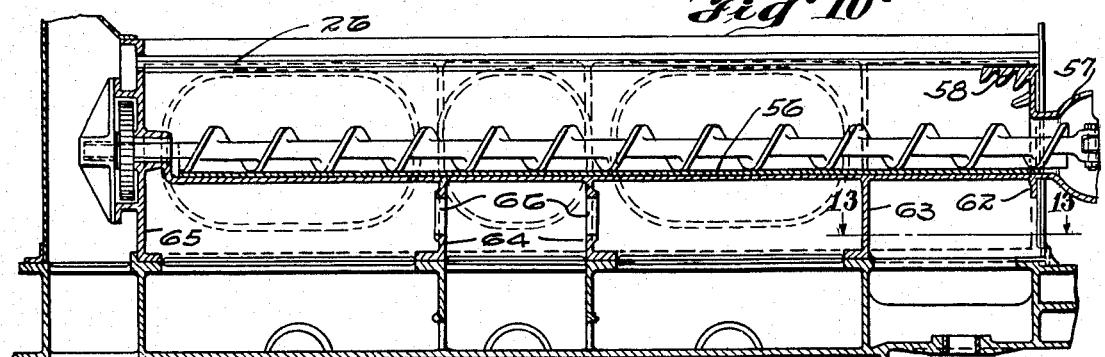
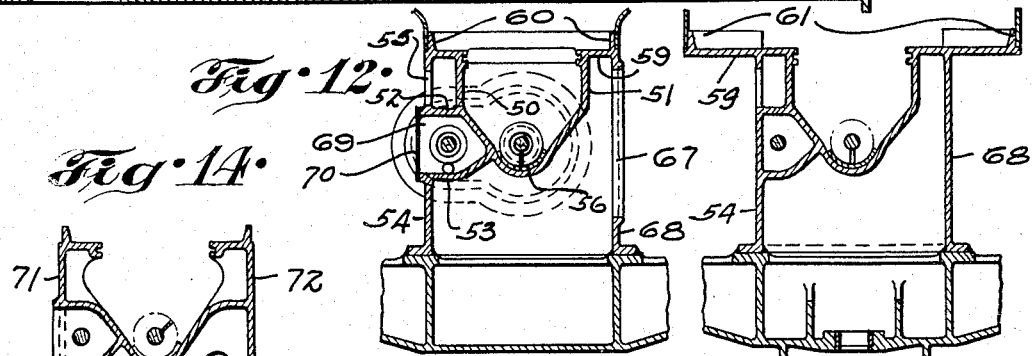
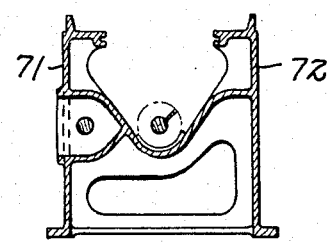
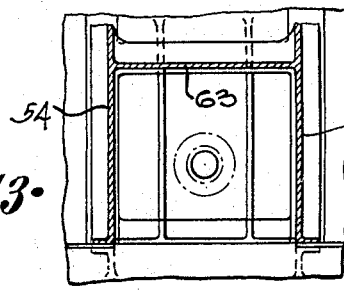

Aug. 1, 1933.  W. L. LENTZ ET AL  1,920,754
LOCOMOTIVE TENDER CONSTRUCTION
Filed Dec. 14, 1929   5 Sheets-Sheet 4
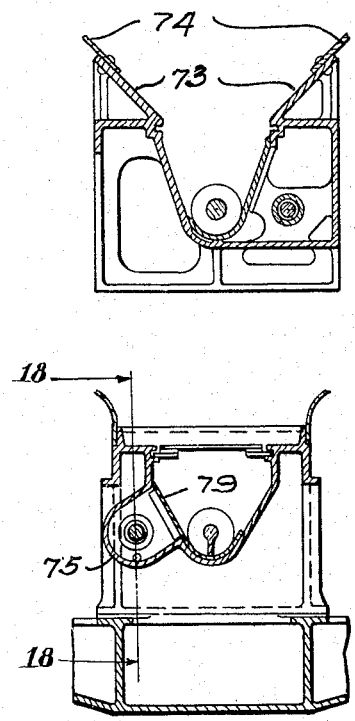
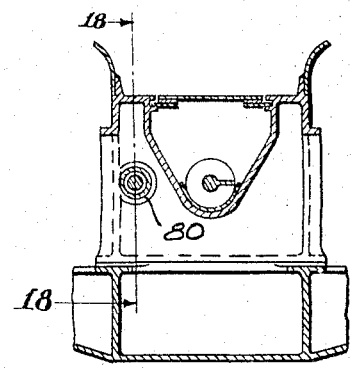
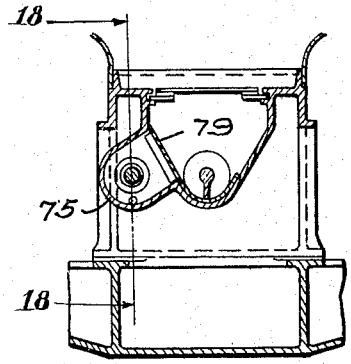
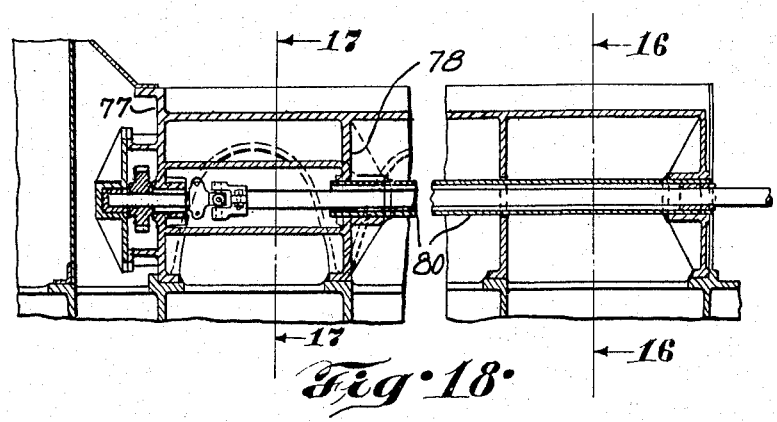
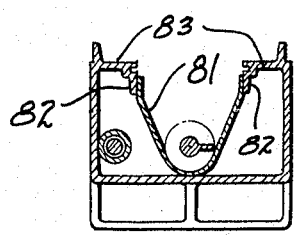

Aug. 1, 1933.　　W. L. LENTZ ET AL　　1,920,754
LOCOMOTIVE TENDER CONSTRUCTION
Filed Dec. 14, 1929　　5 Sheets-Sheet 5
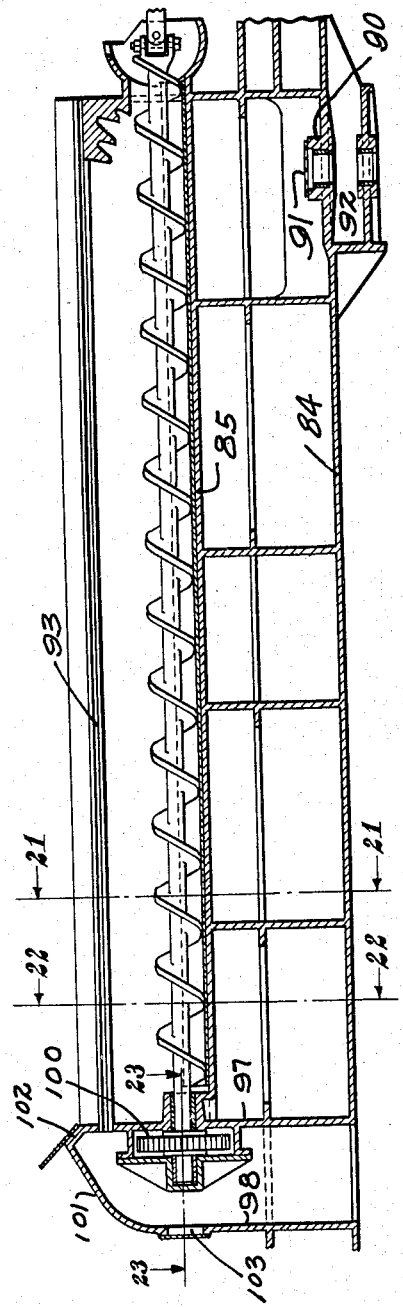
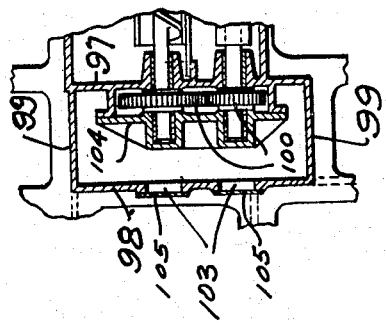
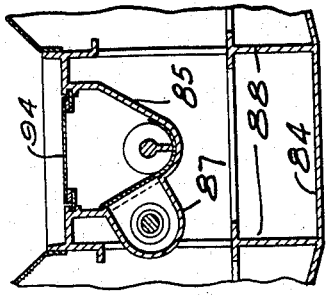
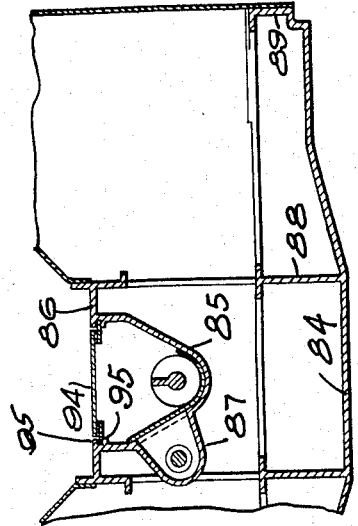
Inventors
William L. Lentz
William M. Sheehan
By Rodney Bedell
Attorney Patented Aug. 1, 1933

1,920,754

UNITED STATES PATENT OFFICE 1,920,754

LOCOMOTIVE TENDER CONSTRUCTION

William L. Lentz, Tuckahoe, N. Y., and William M. Sheehan, St. Louis, Mo.; said Sheehan assignor to General Steel Castings Corporation, Granite City, Ill., a Corporation of Delaware Application December 14, 1929. Serial No. 414,149

32 Claims. (Cl. 105—234)

Our invention relates to railway rolling stock and consists in a novel tender structure particularly applicable to stoker fired locomotives in which the fuel is conveyed mechanically from the fuel compartment in the forward portion of the tender to the locomotive fire box.

The present tendency in locomotive and tender construction is to increase the weight of a locomotive and the capacity of its boiler and the size of its fire box and this requires a corresponding increase in the capacity of the tender, and particularly in the size of its water tank and fuel compartment in order that the locomotive may be operated efficiently over long runs without recharging with water and fuel. In line with the requirement for maximum water and fuel storage, there have been recent developments in the use of the tender underframe as a part of the tank structure, the underframe being provided with a bottom web forming the bottom of the tank and permitting the location of the bottom of the tank at a substantially lower level than has been customary previously, thereby increasing the tank capacity and making available additional fuel storage volume. A tender frame of this type is illustrated in Patent No. 1,666,929, issued to Charles F. Frede.

Obviously, the presence of a stoker mechanism tends to take up a considerable portion of the space which might otherwise be used for carrying water.

One of the main objects of our invention is to construct a tender with a stoker mechanism housing so formed as to reduce the tank capacity of tender as little as possible or conversely to increase the water carrying capacity of a tender for a stoker equipped locomotive.

The tenders of stoker equipped locomotives heretofore in use have had a large compartment under the coal hopper. In this compartment was placed and attached to the walls thereof a stoker conveyor trough. This trough occupied relatively but a small portion of the compartment. The remainder was unused. The compartment walls formed a part of the tender tank.

The compartment walls and the supported mechanism have been heretofore fabricated from a plurality of plates, rolled and pressed shapes and castings riveted or bolted together. The action of the surging water against the compartment walls caused leakage and progressive disintegration. In addition, the work of carrying the conveying and crushing mechanism imposed a still harder duty. The severe service resulting from conveying fuel and forcing it through crusher units results in great stresses and vibration in the conveyor housing and through it to the walls and other parts of the stoker compartment, requiring frequent inspection and tightening of loosened joints and occasional partial or complete renewal of the housing parts.

Another object of our invention is to provide strong, rigid supports for the operating mechanism of the stoker which will adequately resist the forces created by the conveyor and crusher elements because of their construction alone and also because of the fact that they transfer many of the stresses direct to the underframe and superimposed structure. Preferably, these supports will also carry the conveyor trough and elements forming a foundation for walls of the tank and the fuel hopper whereby these walls will be relieved of many of the strains existing in the usual structure. By locating these wall foundation elements near the top of the stoker housing structure, we effect a considerable economy of material and space as we eliminate the relatively wide compartment below the fuel bin which previously has been walled off to accommodate the stoker mechanism. At the same time, we eliminate the horizontal floor of the stoker compartment which has been present in earlier constructions. This simplifies construction and reduces tender maintenance.

Another object of our invention is to make a stoker conveyor housing preferably with its parts integral with each other and preferably integral with the underframe or at least so rigid therewith as to avoid disintegration resulting from the above mentioned conditions of operation.

Another object of our invention is to simplify the coal hopper construction. We also desire to facilitate access to the stoker mechanism without draining the tank or without substantial disassembly of the tender structure.

These and other detailed objects of our invention are attained in the construction illustrated in the accompanying drawings in which—

Figure 1 is a top view of the center portion and one side of the forward end of a tender frame of the type referred to above and having a stoker housing combined therewith.

Figure 2 is a longitudinal vertical section taken on the line 2—2 of Figure 1.

Figure 3 is a side elevation of the stoker housing unit.

Figure 4 is a front elevation of the structure shown in Figure 1.

Figures 5, 6 and 7 are vertical transverse sections taken on the lines 5—5, 6—6 and 7—7 of Figure 2.

Figure 8 is a detail, on an enlarged scale, illustrating the slide-forming portion of the housing, taken on the line 8—8 of Figure 1.

Figure 9 is a longitudinal vertical section through a modified tender structure showing the stoker housing in elevation.

Figure 10 is a similar section through the center of the structure shown in Figure 9.

Figures 11 and 12 are vertical transverse sections taken on lines 11—11 and 12—12 of Figure 9.

Figure 13 is a horizontal section taken on the line 13—13 of Figure 10.

Figure 14 is a vertical transverse section through a similar stoker housing but illustrating a further modification.

Figure 15 is a similar section illustrating another modification.

Figures 16 and 17 are similar sections taken on the lines 16—16 and 17—17 of Figure 18 and illustrate a further modification.

Figure 18 is a longitudinal section through the stoker housing at one side of the conveyor trough as illustrated in Figures 16 and 17 and is taken on the line 18—18 of these figures.

Figure 19 is a vertical transverse section illustrating another modified form of stoker housing and conveyor trough.

Figure 20 is a vertical longitudinal section through the center line of the conveyor trough in another form of our invention.

Figures 21 and 22 are vertical transverse sections taken on the lines 21—21 and 22—22 of Figure 20.

Figure 23 is a horizontal section taken on the line 23—23 of Figure 20.

The tender underframe includes center sills 1 having top flanges 2, side sills 3 having top flanges 4 and a bottom web 5 extending from side sill to side sill and merging with the bottom of the center sills and forming the bottom wall of the water tank structure which also includes superstructure side sheets 6. The underframe has a front end sill 7 and the side portions of the underframe carry water all the way up to the rear wall of this end sill. A suitable compartment 8 is provided between the center sills 1 at the forward end of the frame for permitting the application and removal of draw bar pins which may be seated in the bearings 9 in the usual manner. This compartment 8 will be completed by a portion of the stoker housing referred to later.

The stoker housing may be described generally as comprising three members. One of these is a front member extending across the underframe center sills immediately behind the end sill and forming a box-like cover over the compartment 8 and serving to mount the front end of the conveyor, the crusher members and the universal joint carried by the tender. A second member extends across the center sills at the rear of the stoker device and forms a housing for the stoker gearing and a foundation frame for the rear wall of the fuel compartment. These members serve as substantial supports for the fuel compartment during the process of filling. A third member extends between the first two members and forms the conveyor trough and a portion of the shoveling floor and an elevated foundation for the side walls of the fuel compartment.

The front member includes front and rear walls 15 and a top wall 15ᵃ and side walls 10 and 11. The front, rear and side walls are provided with flanges 30 along their lower edges for attachment, either by welding or riveting or both, to the tender underframe. The front wall 15 mounts the coal crusher element 32 and the universal joint element 31.

The rear member includes a vertical wall 16 with flanges 35 which form, with wall 16, a housing for the conveyor gearing G. A removable cover plate 36 is applied to flanges 35 and the wall 16 and plate 36 includes bearings 33 and 37 for the stoker screw shaft and also includes bearings 34 and 38 for the drive shaft D. The lower part 17 of the rear member extends across the space between the transverse webs 39 of the underframe and is provided with a rectangular opening corresponding to a similar opening 40 in the underframe through which access may be had to the rear of the stoker gearing. The vertical portions 42 of member 17 serve to mount the rear wall 43 of the fuel compartment and the fuel compartment and tank walls 19. A cover plate 44 extends from wall 43 to a flange 122 on the top of wall 16 completing the box-like compartment at the rear of the gearing.

The third member of the structure includes a trough T extending between the front and rear members and including upright walls 21 and 22 converging at their lower portion and merging with a bottom wall 13 and at their upper edges merging with a horizontal wall 12 extending outwardly from the sides of the trough and terminating in vertical flanges 18 to which the fuel and water compartment walls 19 are secured.

While it is within the spirit of our invention to include element 22 as a part of the casting (see modification in Figure 11), we prefer to use a separate plate for this purpose in order to provide thereby a wear plate adjacent the conveyor screw S which may be renewed when unduly worn and may be removed to get at the driving shaft D.

The side members 110 and 111 of the housing are spaced outwardly from the trough and form, in effect, a series of arches between the front and rear members, bracing the latter and supporting the shoveling floor and the side walls of the fuel and water compartment. Transverse members 14 extend between these side members 110 and 111 and rest on the corresponding transverse members of the underframe directly supporting the trough thereon. Members 14 are provided with ample openings 20 whereby their weight and volume is substantially reduced without any material sacrifice of strength.

In the preferred structure shown in Figures 1 to 8, inclusive, these members of the stoker housing are united in a single structure consisting of a one-piece casting or of one or more members welded into an integral whole, and this structure is shown as welded to the underframe, thereby uniting the entire underframe and stoker housing into a single unit, combining great strength and rigidity for the amount of material utilized. However, each of the members of the stoker housing may be formed separately and bolted or riveted to the underframe or welded thereto, or assembled therewith by a combination of rivets, bolts and welds and still retain many of the desirable features of our structure. If preferred, the housing may be cast integral with the underframe, as shown in Figures 20 to 23.

If the underframe and stoker housing is formed separately, the tops of the underframe side sills and end sills may be machined in a common horizontal plane whereby two underframes may be applied top to top and clamped together for the purpose of testing for leaks before the tender structure is completed.

By means of suitable rabbeting 26 and the addition of a slide strip 27 (see Figure 8), we adapt the structure to mount a series of slide plates 28 which can be moved longitudinally to vary the admission of fuel to any portion of the conveyor screw. These plates form a cover for the trough and may be slid lengthwise to any desired extent to permit the passage of fuel to the conveyor screw. These plates cooperate with top wall 12 to form a floor and shoveling surface for the fuel compartment.

With the above described structure, the front member forms a brace extending transversely of the underframe and transfers to the underframe the torsional and longitudinal stresses set up by the crushing mechanism. In addition, this front member mounts the tank end walls 3ª which contribute to the rigidity of the structure. Similarly, the rear member transfers to the underframe the torsional and longitudinal stresses created by the driving mechanism and this member is also reinforced by the superstructure plates 43 and 44 secured thereto.

Figures 9 to 13 illustrate a modified form of our invention in which both sides 50 and 51 of the conveyor trough are cast with the housing and short transverse horizontal webs 52 and 53 connect the left hand side 50 of the conveyor trough with the corresponding side wall 54 to form an elongated chamber for the drive shaft. In this form of our invention, there is no bottom wall corresponding to wall 13 in the preferred form and the water capacity is increased accordingly. Additional water capacity is also provided by the openings 55 in the upper part of side wall 54 which extends the water chamber into the trough side 50. A renewable wear plate 56 may be applied to the lower portion of the trough.

In this form of our invention the conveyor tube universal joint element 57 and the fuel crusher element 58 are part of the housing. At the forward end of the housing the top wall 59 is extended laterally beyond the side walls and the slope sheet attaching flange 60 is off-set, as indicated at 61, whereby a wider shoveling platform is provided at this point.

Suitable transverse walls 62, 63, 64 and 65 support the trough. Transverse walls 63 and 65 are imperforate to retain the water while walls 64 are provided with substantial openings 66 to lighten the casting. These openings in walls 64 also provide for free passage of water as do the openings 67 in the right hand side wall 68.

Near the end of the housing, the wall 54 is provided with an opening 69 permitting access to the driving shaft chamber and this opening is closed by a suitable plate 70. Obviously, this plate can only be removed, and access to the drive shaft compartment had, when the water tank is drained.

Figure 14 illustrates another modification in which the trough is widened to extend out to the side walls 71 and 72 of the housing.

Figure 15 illustrates another modification in which the trough is deeper and more of a V-shape and in which the upper portion includes inclined webs 73 forming the lower portion of the fuel hopper and to which the side slope sheets 74 may be easily secured.

In Figures 16 to 18, we illustrate another modification directed more particularly to the construction of the drive shaft chamber. The rear portion of the housing includes, as a part thereof, a bulge 75 in one of the trough sides and extending from the rear wall 77 of the housing forward for a short distance. This opening encloses the universal joint on the drive shaft and is accessible from the trough by removal of the cover plate 79. From the bulge forwardly the drive shaft is enclosed in a tube 80 which is welded to the transverse walls of the housing.

Figure 19 illustrates another modification in which the trough is formed entirely by a plate 81 secured to depending flanges 82 on the top wall 83.

In Figures 20 to 23 we illustrate another form of our invention in which the stoker housing and the underframe comprise a single casting including the horizontal web 84 forming the bottom of the tank, the trough 85, the deck or bottom of the fuel compartment 86, the drive shaft compartment 87 and sills 88 and 89.

The boss 90, forming the upper seat for the draw bar pin (not shown), is covered by a plate 91 and the space above the draw bar pocket 92 is made available for water. In this structure, as in other modifications, the grooves 93 for the slide plates 94 are formed by integral lugs 95 formed on the top plate 86 and on the sides of the trough.

The rear end of the housing includes spaced walls 97 and 98 and side walls 99 forming an enclosed inspection chamber providing access to the drive gear 100. The rear wall 98 is shaped upwardly and forwardly, as shown at 101, to meet an inclined flange 102 on wall 97 and form the top of the compartment. Openings 103 in wall 98 provide for manipulation of the conveyor screw shaft and the cover 104 for gearing 100. These openings are shown as closed during operation by cover plates 105.

In each of the forms of our invention described above, the general objects stated in the introductory part of the specification are attained to a marked degree. The water capacity of the tender below the fuel compartment is increased many hundred gallons without increase in the overall dimensions of the tender structure and the weight of the tender structure is reduced materially from that required where the underframe, tank sheets and stoker structure are fabricated and secured to each other in the usual manner. In addition, a complete structure is provided which is more durable and may be maintained more easily and less expensively than the ordinary tender structure. While we have illustrated a stoker housing together with other elements formed in a one-piece casting, we consider it within the spirit of our invention to form the stoker housing alone or in combination with other elements illustrated by welding together parts cast separately, or otherwise formed separately, into a unit free from overlapping flanges and riveted joints which are subject to corrosion and leakage, which is highly detrimental.

Many variations in the form and details of the structure may be made apart from the modifications illustrated and we contemplate the exclusive use of any modifications coming within the scope of our claims.

We claim:

1. In a locomotive tender structure, a tank including an underframe forming the tank bottom, a stoker housing integral with said underframe, said housing including a conveyor trough spaced above the bottom of said tank, the structure being adapted to contain liquid throughout the width of the underframe in the space below said trough.

2. A locomotive tender underframe forming a tank bottom member and including a stoker housing extending above said member and provided with a conveyor trough and a drive shaft compartment, all of said parts being integral with each other and providing space for liquid inside of said housing and outside of said trough and compartment.

3. As a new article of manufacture, a stoker housing adapted to be mounted on a locomotive tender underframe and comprising supporting side members, a conveyor trough between said members, and elements on the upper portions of said side members for mounting tender coal-compartment sheets, all of said parts being integral with each other.

4. As a new article of manufacture, a stoker housing adapted to be mounted on a locomotive tender underframe and comprising a substantially box-shaped structure having a conveyor trough in its upper portion and adapted to receive liquid below said trough, all of said parts being integral with each other.

5. As a new article of manufacture, a stoker housing adapted to be mounted on a locomotive tender underframe and comprising side walls, a rear end wall, a conveyor trough in front of said wall, and a horizontal extension projecting rearwardly from said end wall and having an inspection opening and including elements surrounding said opening for mounting tank sheets.

6. As a new article of manufacture, a stoker housing adapted to be mounted on a locomotive tender underframe and comprising in an integral structure supporting side members, a conveyor trough between and spaced from said side members, a drive shaft compartment between said trough and one of said side members, and elements in said compartment forming bearings for a drive shaft.

7. As a new article of manufacture, a stoker housing adapted to be mounted on a locomotive tender underframe and comprising in an integral structure side walls, a conveyor trough, and a substantially semi-spherical element at the front end of said trough adapted to form part of a universal joint between said trough and a conduit leading therefrom.

8. As a new article of manufacture, a stoker housing adapted to be mounted on a locomotive tender underframe and comprising in an integral structure side walls, a conveyor trough, and a coal crusher element.

9. In a locomotive tender underframe, a horizontal web forming the bottom of the tender tank, an end sill extending upwardly from said web, a draw bar pocket below said web at the rear of said end sill, there being an opening in said web above said pocket for receiving drawbar pin elements, upstanding walls cooperating with said sill to form the sides of a chamber over said pocket and around said opening, and a stoker housing carried on said walls and end sill and forming therewith a water seal about said opening.

10. In a locomotive tender, an underframe including a lower horizontal web forming the bottom of a water compartment extending across the central portion of the tender, sills extending upwardly from said web, tender tank side sheets, sheets forming fuel compartment partitions, and a stoker housing including units forming a bottom wall for said fuel compartment and a conveyor screw trough elevated above the bottom of said water compartment and having vertical elements resting on said sills and supporting said bottom wall and trough.

11. In a locomotive tender, an underframe having a bottom web forming the bottom wall of the tender tank, longitudinal sills above said web, a stoker housing supported on said sills and including a top wall having a depression forming a conveyor trough, said wall forming the top of a water receiving compartment extending across the center portion of the tender.

12. In a locomotive tender, an underframe, a stoker structure including a conveyor trough and support elements therefor extending lengthwise thereof and depending therefrom to rest upon said underframe, and members forming a water compartment extending from side to side of the tender below said trough.

13. In a locomotive tender, underframe sills, a stoker trough mounted thereon, and elements between said sills forming the bottom of a water compartment extending below said trough.

14. In a tender structure, an underframe including a horizontal web forming the bottom of the tender tank sills, a stoker housing mounted on said sills, a conveyor trough in said housing, conveyor gearing at the rear of said housing, there being an opening in said web below said gearing, and upstanding walls surrounding said opening for mounting said housing and tank superstructure plates to provide a water excluding chamber adjacent to said gearing and permit access thereto.

15. In a locomotive tender, spaced longitudinal sills, and a stoker conveyor trough located intermediate said sills and above the level of the same, the space between said sills and beneath said trough forming a liquid compartment.

16. In combination, a tender underframe forming the bottom of the tender tank, coal crushing elements, driving mechanism therefor, and a housing for said mechanism rigidly secured to said frame.

17. In combination, a tender underframe including spaced longitudinal sills, coal crushing elements and driving mechanism therefor located between said sills, and a housing for said mechanism extending across said sills and rigidly secured thereto.

18. In combination, a tender underframe including spaced sills, a stoker conveyor device, a fuel compartment, stoker driving mechanisms associated with said device and positioned near the ends thereof, and individual housings for said mechanisms spanning the space between said sills and securely attached thereto.

19. In combination, a tender underframe forming the bottom of the tender tank, a conveyor trough, and supporting and stiffening members for said trough mounting the same above said underframe and extending transversely beyond the sides of said trough.

20. A rigid unit for a tender underframe, comprising a front member for mounting a stoker fuel crushing device, a rear member for mounting a stoker driving mechanism and an intermediate member constituting a conveyor enclosure, said unit forming a fuel coal compartment floor and including elements for mounting fuel and water compartment upright walls.

21. In combination, spaced underframe sills, transverse members extending across said sills, and a trough-shaped member located above said sill of less width than the space between said sills and connecting and bracing said members.

22. In a device of the class described, an integral trough structure including side walls, and lateral projections from the upper portions of said walls and downward extensions from said trough, said trough and lateral extensions forming an imperforate top wall of a liquid compartment and said downward extensions supporting said trough in an elevated position in said compartment.

23. In a stoker device for a locomotive tender, a trough element, an upright wall at the end of said trough element forming the end of the trough, and a support for the same, there being an open frame extending horizontally and rearwardly of the lower portion of said wall for attaching tank sheets to the device at points spaced from said wall, all of said parts being integral with each other.

24. In a stoker device for a locomotive tender, a conveyor screw trough, spaced transverse walls integral with and projecting from the side of said trough for receiving a driving shaft, there being a tubular shaft-housing extending between and bracing said walls.

25. In combination, a tender underframe forming the bottom of a water compartment extending substantially from side to side of the tender, and a stoker device comprising a trough, support members extending downwardly from said trough through said compartment for mounting the same on said tender underframe, and projections extending laterally from the upper portion of said trough and provided with elements at their outer edges for mounting fuel compartment side plates.

26. In combination in a locomotive tender having a base, a body portion comprising fuel and water compartments, means separating said compartments including rear and side sloping partition plates and a separable fuel trough securely attached to the lower marginal portions of said plates and arranged therewith to form a water tight joint between said compartments, and a horizontally disposed centrally and longitudinally apertured floor for said fuel compartment, said floor being formed integrally with said fuel trough and arranged to receive shiftable cover plates for its apertured portion.

27. A stoker conveyor trough for a locomotive tender made in a single casting and having inturned flanges for the sliding plates for regulating the flow of material to the trough, said inturned flanges being perforated to prevent the accumulation of materials on the slideways of the flanges.

28. In combination in a locomotive tender having a base, a body portion including the conventional form of bulkheads and comprising fuel and water compartments, means separating said compartments including rear and side partition plates and a separable trough member securely attached to the lower marginal portions of said plates and arranged therewith to form a water tight joint between said compartments, and a floor for said fuel compartment, said trough member extending within the water compartment and at its forward end being arranged to form a closure therefor between said bulkheads and below said floor, and an alcove between said bulkheads below said floor to receive stoker drive mechanism.

29. A locomotive tender underframe including integral elements forming a stoker conveyor trough, and elements forming a water compartment extending from side to side of the underframe beneath the level of said trough.

30. A locomotive tender underframe including integral elements forming a stoker conveyor trough and a housing for the conveyor drive shaft, and elements forming a water compartment extending from side to side of the underframe beneath the level of said trough and housing.

31. In a locomotive tender underframe, a bottom web arranged to form the bottom of the tender tank, longitudinally disposed upright webs extending upwardly from said bottom web and forming sill members, a stoker conveyor trough integral with said upright webs and spaced above said bottom web, there being a water receiving compartment extending between said members and between said bottom web and said trough.

32. As a new article of manufacture, a locomotive stoker housing comprising in an integral structure a conveyor trough, and side walls for supporting the same on a locomotive underframe, said trough and at least one of said walls forming a drive shaft compartment.

WILLIAM L. LENTZ.
WILLIAM M. SHEEHAN.